United States Patent
Zeng et al.

(10) Patent No.: US 12,320,678 B2
(45) Date of Patent: Jun. 3, 2025

(54) ELECTROMAGNETIC INDUCTION TYPE ROCKER POTENTIOMETER

(71) Applicant: Guangdong Jinfu Intelligent Technology Co., Ltd., Dongguan (CN)

(72) Inventors: Guosheng Zeng, Dongguan (CN); Zhong Zeng, Dongguan (CN); Shengkai Huang, Dongguan (CN)

(73) Assignee: Guangdong Jinfu Intelligent Technology Co., Ltd, Dongguan (CN)

( * ) Notice: Subject to any disclaimer, the term of this patent is extended or adjusted under 35 U.S.C. 154(b) by 174 days.

(21) Appl. No.: 18/305,344

(22) Filed: Apr. 22, 2023

(65) Prior Publication Data

US 2024/0159568 A1 May 16, 2024

(30) Foreign Application Priority Data

Nov. 14, 2022 (CN) .......................... 202223015965.7
Feb. 21, 2023 (CN) .......................... 202320262655.0

(51) Int. Cl.
*G01D 5/14* (2006.01)
*G05G 9/047* (2006.01)

(52) U.S. Cl.
CPC ............. *G01D 5/145* (2013.01); *G05G 9/047* (2013.01); *G05G 2009/04755* (2013.01)

(58) Field of Classification Search
CPC ................... G01D 5/145; G05G 9/047; G05G 2009/04755
See application file for complete search history.

(56) References Cited

U.S. PATENT DOCUMENTS 9,714,849 B2 * 7/2017 Biwersi .................. G01D 7/005
2009/0276180 A1 * 11/2009 Schneider ................ G01D 5/58
356/614

FOREIGN PATENT DOCUMENTS

| CN | 215815437 U | 2/2022 |
| CN | 217210723 U | 8/2022 |
| CN | 218384665 U | 1/2023 |

* cited by examiner

*Primary Examiner* — Reena Aurora

(57) ABSTRACT

An electromagnetic induction type rocker potentiometer is provided, including a base, a sliding disc, a rocker handle, two rocking arms, an iron housing and two potentiometer assemblies. The potentiometer assemblies are disposed on the iron housing and respectively include a shell, a rotor, a permanent magnet and a magnetic sensing circuit board. The magnetic sensing circuit board is molded on the shell to accurately position a magnetic sensor, thereby improving sensing accuracy. The permanent magnet is cuboid and a distance between the permanent magnet and the magnetic sensor in an axial direction of the rotor does not change along with rotation of the rotor. As the rotor rotates forward or backward, the magnetic strength of the permanent magnet at the magnetic sensor increases or decreases linearly, so that the change process of induction signal is synchronized with the rotation process of the rotor.

11 Claims, 9 Drawing Sheets

ELECTROMAGNETIC INDUCTION TYPE ROCKER POTENTIOMETER

TECHNICAL FIELD

The disclosure relates to the field of potentiometer technologies, and particularly to an electromagnetic induction type rocker potentiometer.

BACKGROUND

A rocker potentiometer is a variable potentiometer suitable for a rocker control handle of a game console, an unmanned aerial vehicle or the like. By shaking a rocker handle of the rocker potentiometer and thereby adjusting a resistance value through a brush mechanism of the potentiometer, the control of state change of internal related components of the game console, the unmanned aerial vehicle or the like can be realized.

A Chinese patent document with a publication No. CN218384665U discloses a rocker potentiometer with a central positioning sliding disc, including: a base, a sliding disc, a rocker handle, a lower rocking arm, an upper rocking arm, an iron housing, a first potentiometer assembly and a second potentiometer assembly. Each of the first potentiometer assembly and the second potentiometer assembly is structurally composed of a resistor and a rotating or sliding system, that is to say, by way of a moving contact moves on the resistor, partial voltage output can be obtained. However, the potentiometer assemblies each use a carbon film or a resistance wire, which requires the contact to be in contact with and rub against the carbon film to thereby realizing detection of different positions of the potentiometer, and thus the potentiometer has shortcomings as follows: (1) the carbon film is easy to wear off, and has a short service life and a large production error; and (2) due to the friction of the contact, there may be interference clutters generated from the contacting when the position changes. An electromagnetic induction type potentiometer can overcome the shortcomings of the potentiometer with contact-type structure described above. The electromagnetic induction type potentiometer uses a permanent magnet as a component of the rotating or sliding system and uses a linear Hall sensor to detect a position of the permanent magnet in real time. Therefore, during the position adjustment of the electromagnetic induction type potentiometer, there is no contact, no wear and no clutter interference.

Another Chinese patent document with a publication No. CN215815437U discloses an electromagnetic induction type potentiometer, including: a shell, a rotor, a permanent magnet and a magnetic sensor. The shell is provided with a first cavity, and the rotor is accommodated in the first cavity and is rotatable relative to the shell; the shell is further provided with a second cavity, and the magnetic sensor is accommodated in the second cavity; the rotor is defined with a through hole used for external rotation input, and is further provided with a buckle piece for fixing the permanent magnet on the rotor. However, the technical solution disclosed in the above patent document has deficiencies as follows. On one hand, although the second cavity of the shell can accommodate the magnetic sensor therein, it cannot accommodate a magnetic sensing circuit board. Since the magnetic sensor is usually packaged as an integrated circuit (IC) chip and the IC chip needs to be soldered onto the circuit board, and therefore, when the shell accommodates the magnetic sensor, it is needed to first install the circuit board onto other external mechanism, and then the second cavity of the shell is sleeved on the magnetic sensor of the circuit board. Such installation method easily leads to inaccurate positioning between the circuit board and the shell, and makes the position of the magnetic sensor in the second cavity change slightly, thereby reducing the sensing accuracy of the electromagnetic induction type potentiometer. On the other hand, as the rotor rotates, a distance between the permanent magnet and the magnetic sensor constantly changes. Since the permanent magnet have an S pole and an N pole, when the rotor rotates at a constant speed in a forward direction or a reverse direction, a magnetic strength of the permanent magnet at the position of the magnetic sensor will experience a jumping change phenomenon of increasing or decreasing in an accelerated manner, and such the jumping change phenomenon easily leads to the problem that an induction signal of the electromagnetic induction type potentiometer changes too fast or too slowly.

SUMMARY

Aiming at the drawbacks in the art, a technical problem to be solved by the disclosure is to provide an electromagnetic induction type rocker potentiometer. The electromagnetic induction type rocker potentiometer includes a first potentiometer assembly and a second potentiometer assembly, which both use an electromagnetic induction type potentiometer. A magnetic sensing circuit board of each of the first potentiometer assembly and the second potentiometer assembly is molded directly into a shell of the potentiometer assembly, thereafter a position of a magnetic sensor disposed inside the potentiometer assembly on the shell is precise and does not change, improving sensing accuracy of the first potentiometer assembly and the second potentiometer assembly. A distance between each of permanent magnets of the first potentiometer assembly and the second potentiometer assembly and the corresponding magnetic sensor in an axial direction of the rotor does not change along with the rotation of the rotor. Therefore, when the rotor rotates in a forward direction or a reverse direction, a magnetic strength of the permanent magnet at the position of the magnetic sensor increases or decreases linearly, thereby keeping synchronization between an induction signal change process of each the potentiometer assembly and the rotation process of the rotor.

In order to achieve the above objective, the disclosure provides a technical solution as follows. The disclosure provides an electromagnetic induction type rocker potentiometer, including a base, a sliding disc, a rocker handle, a lower rocking arm, an upper rocking arm, an iron housing, a first potentiometer assembly and a second potentiometer assembly. The base is provided with a cavity, the sliding disc is disposed in the cavity of the base, the rocker handle is disposed on the sliding disc, the iron housing is disposed outside the base, the lower rocking arm and the upper rocking arm are individually sleeved on the rocker handle, the upper rocking arm is located above the lower rocking arm and two ends of each of the lower rocking arm and the upper rocking arm individually extend outwards to outside the iron housing and the base. Furthermore, the first potentiometer assembly and the second potentiometer assembly are individually disposed on the iron housing and each of the first potentiometer assembly and the second potentiometer assembly includes a shell, a rotor, a permanent magnet and a magnetic sensing circuit board. Moreover, a left side of the shell is provided with a first concave cavity, the rotor is accommodated in the first concave cavity and is rotatable relative to the shell; a right side of the shell is injection molded to seal the magnetic sensing circuit board, a bottom end of the magnetic sensing circuit board is connected with metal pins to extend downwardly to outside the shell, the magnetic sensing circuit board has a magnetic sensor disposed thereon, and the magnetic sensor faces towards a bottom of the first concave cavity at the left side of the shell. In addition, the rotor is provided with a first through hole and a second concave cavity, the permanent magnet is fixedly mounted in the second concave cavity, a right side of the permanent magnet faces towards the magnetic sensor and a distance between the permanent magnet and the magnetic sensor in an axial direction of the rotor does not change along with rotation of the rotor. And, one of the two ends of the lower rocking arm is rotatably inserted into the first through hole of the rotor of the first potentiometer assembly and one of the two ends of the upper rocking arm is rotatably inserted into the first through hole of the rotor of the second potentiometer assembly.

In an embodiment, a shape of each of the second concave cavity and the permanent magnet is cuboid.

In an embodiment, a side portion of the cavity of the base is connected with a plurality of guide feet, and a side portion of the sliding disc is connected with a plurality of guide bars corresponding to and slidably engaged with the plurality of guide feet. In addition, a middle portion of the cavity of the base is provided with a vertical central rod, a middle portion of the sliding disc is provided with a vertical central tube, the central tube has a central through hole with opened ends, and the central rod is inserted upwards into the central through hole of the central tube. Furthermore, a lower end of the rocker handle is provided with a rocker base, which slidably fits with an upper surface of the sliding disc, a lower side of the rocker base is provided with a spherical protrusion, which is arranged above a middle portion of the central through hole. Moreover, an upper end of the central rod is provided with a frustum-shaped protrusion, an upper end of the frustum-shaped protrusion is provided with a concave surface and the spherical protrusion fits with the concave surface.

In an embodiment, the lower rocking arm includes a lower rocking arm body and a lower rocking arm rotation shaft connected with two ends of the lower rocking arm body; and the lower rocking arm body arches upwards and is movably sleeved on the rocker. Similarly, the upper rocking arm includes an upper rocking arm body and an upper rocking arm rotation shaft connected with two ends of the upper rocking arm body; and the upper rocking arm body arches upwards and is movably sleeved on the rocker.

In an embodiment, the first through hole of the rotor of each of the first potentiometer assembly and the second potentiometer assembly is a I-shaped through hole or a rectangular through hole, an end portion of each of the lower rocking arm rotation shaft and the upper rocking arm rotation shaft is provided with an I-shaped insertion bar or a rectangular insertion bar that is matched with the first through hole. Furthermore, a pin shaft is inserted between the lower rocking arm and the rocker handle, and an axial direction of the pin shaft is consistent with an axial direction of the upper rocking arm rotation shaft.

In an embodiment, the electromagnetic induction type rocker potentiometer further includes a spring, and a first spring seat is disposed in the cavity of the base, a lower end of the sliding disc is provided with a second spring seat, a lower end of the spring is disposed above the first spring seat, and an upper end of the spring is disposed below the second spring seat.

In an embodiment, inner walls of the plurality of guide feet are provided with a plurality of guide slots, respectively; and at least one of the plurality of guide slots is provided with a position limit mechanism, and the position limit mechanism is configured to limit a sliding endpoint position of a corresponding one of the plurality of guide bars.

In an embodiment, the right side of the shell is provided with a second through hole, the second through hole is communicated with the first concave cavity and located between the first concave cavity and the magnetic sensing circuit board, the magnetic sensor leftwards passes through the second through hole and extends into the first concave cavity, and the magnetic sensor is packaged as an integrated circuit chip.

In an embodiment, the second concave cavity is located at a lower end of the rotor, a right side of the second concave cavity is opened, the permanent magnet is snapped into the second concave cavity from right to left, a left side of a middle portion between two magnetic poles of the permanent magnet is provided with a magnet slot, and the second concave cavity is provided with a convex bar matched with the magnet slot.

In an embodiment, a bottom of the first concave cavity is provided with a first limit surface, a right side of a middle portion of the rotor is provided with a circular boss, the first through hole penetrates the circular boss, and a right side surface of the circular boss and the first limit surface are position-limiting fitted with each other. Furthermore, a lower end of the first concave cavity is provided with an arc-shaped limit block, a left side of the arc-shaped limit block is provided with an arc-shaped limit surface, and a right side surface of a lower end of the rotor and the arc-shaped limit surface are position-limiting fitted with each other.

In an embodiment, corners at the left side of the shell are provided with three shell positioning columns extending leftwards, and the iron housing is provided with iron housing positioning holes insertedly matched with the three shell positioning columns respectively. In addition, a middle portion of the left side of the shell is provided with two positioning hooks extending leftwards, and the iron housing is provided with positioning slots configured to be snapped with the positioning hooks, respectively.

The disclosure has beneficial effects as follows. The first potentiometer assembly and the second potentiometer assembly of the disclosure adopt the electromagnetic induction type potentiometers, and the right side of the shell of the potentiometer assembly is injection molded to seal the magnetic sensing circuit board. Therefore, such the above setting enables the magnetic sensing circuit board to be directly fixed and connected on the shell and the position of the magnetic sensor on the shell accurate and not change, thereby increasing sensing accuracy of each of the first potentiometer assembly and the second potentiometer assembly. Furthermore, the permanent magnets of the first potentiometer assembly and the second potentiometer assembly are fixedly installed in the second concave cavity of each the rotor respectively to face towards the magnetic sensor and the distance between the permanent magnet and the magnetic sensor in the axial direction of the rotor does not change with the rotation of the rotor. Therefore, such the above setting enables the magnetic strength of the permanent magnet at the position of the magnetic sensor to increase or decrease linearly when the rotor rotates in the forward or reverse direction, so that the change process of the induction signal is synchronized with the rotation process of the rotor. The shape of the second concave cavity and permanent magnet of the disclosure are cuboid respectively, and the cuboid permanent magnet is easy to process and manufacture into shape. In addition, the disclosure uses injection molding to seal the magnetic sensing circuit board, which can significantly improve the efficiency of assembling and the accuracy of connecting and fixing between the magnetic sensing circuit board and the shell.

REFERENCE NUMERALS

Figure 1:
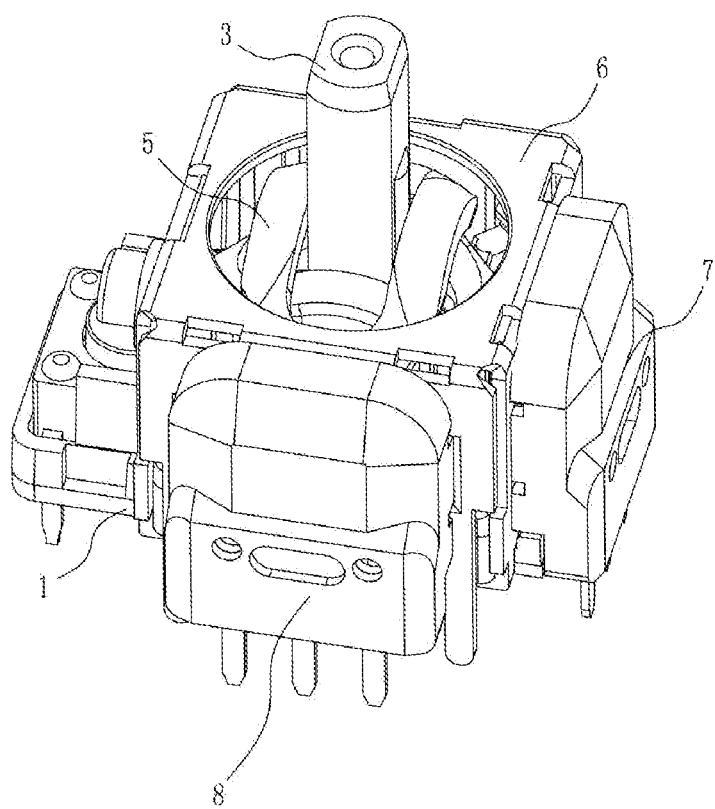
FIG. 1 illustrates a schematic diagram of an overall structure of an electromagnetic induction type rocker potentiometer according to some embodiments of the disclosure.
Figure 2:
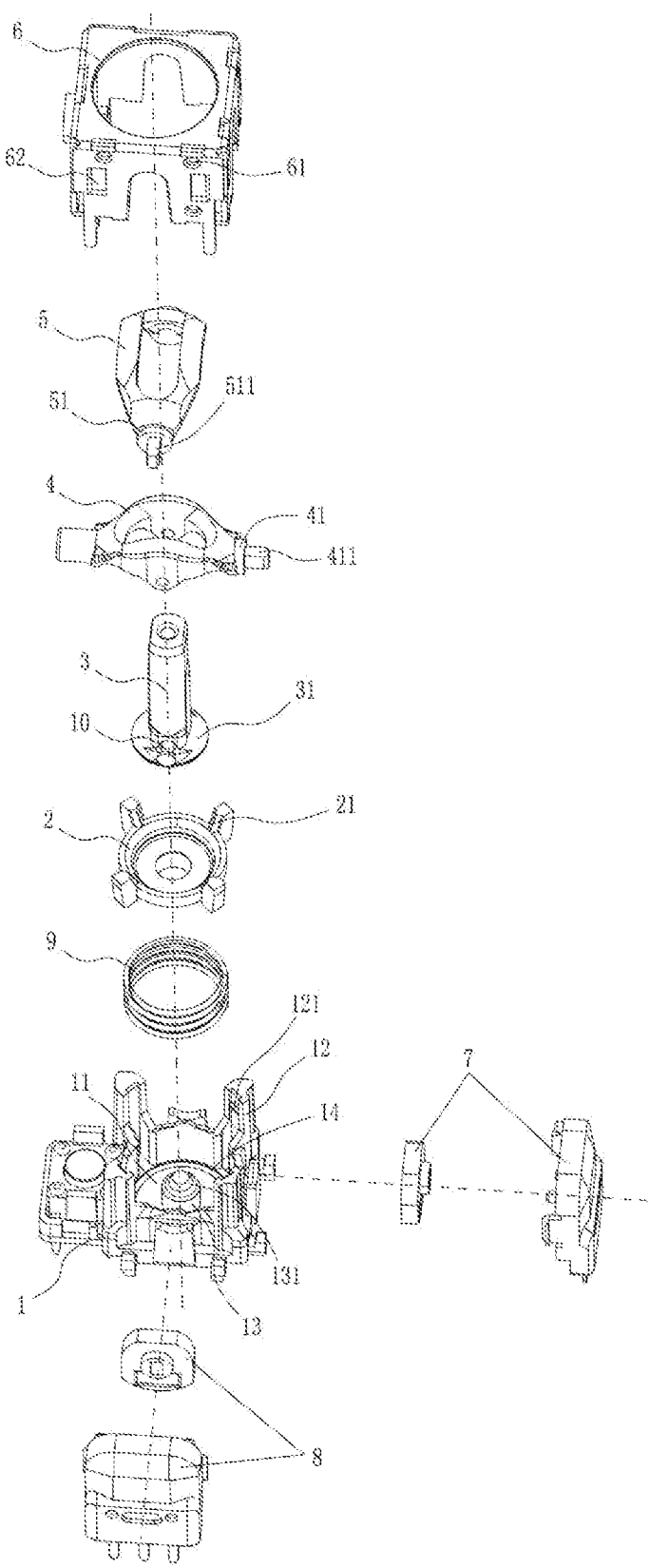
FIG. 2 illustrates a schematic disassembled structural diagram of the electromagnetic induction type rocker potentiometer according to some embodiments of the disclosure.
Figure 3:
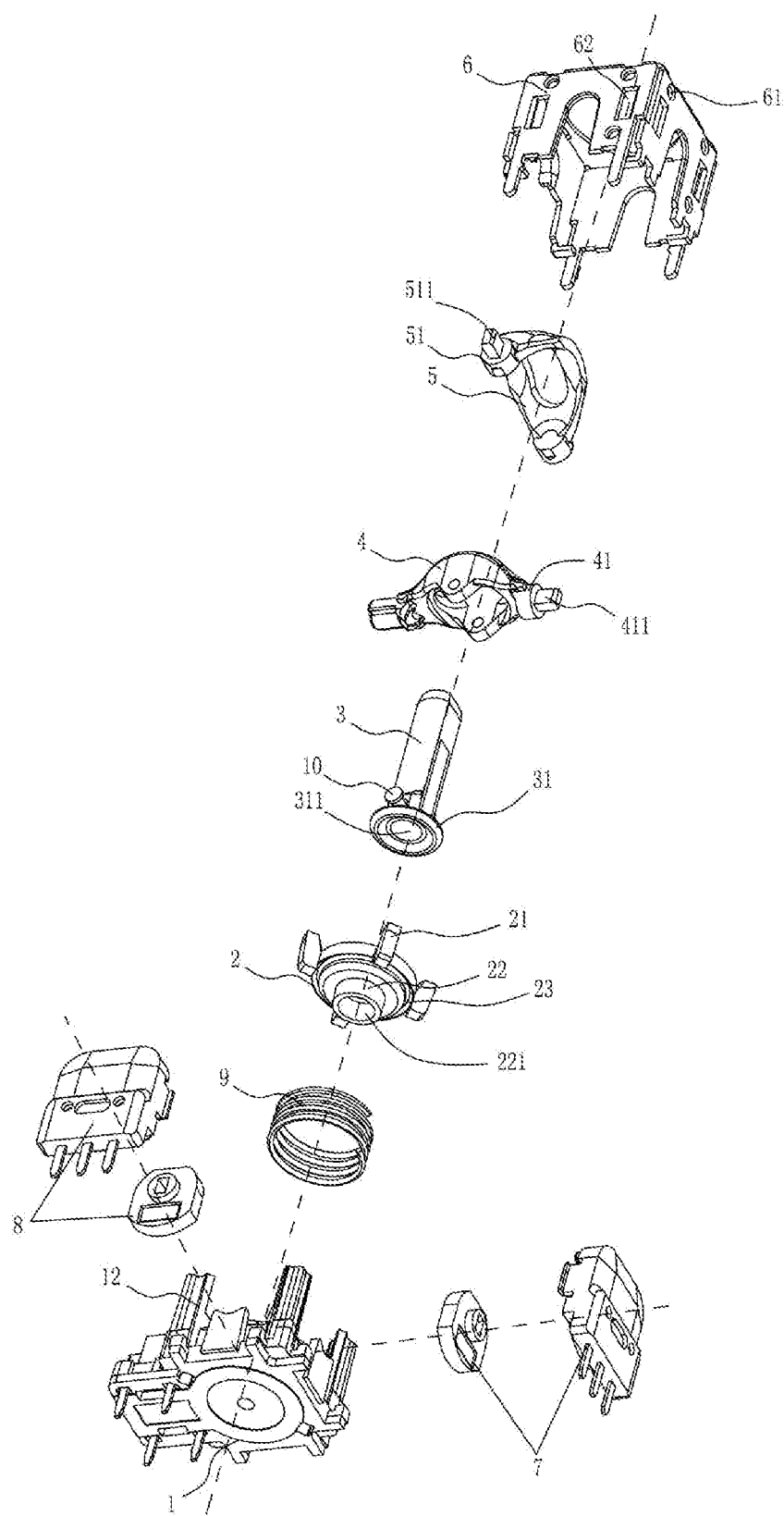
FIG. 3 illustrates another schematic disassembled structural diagram of the electromagnetic induction type rocker potentiometer according to some embodiments of the disclosure.
Figure 4:
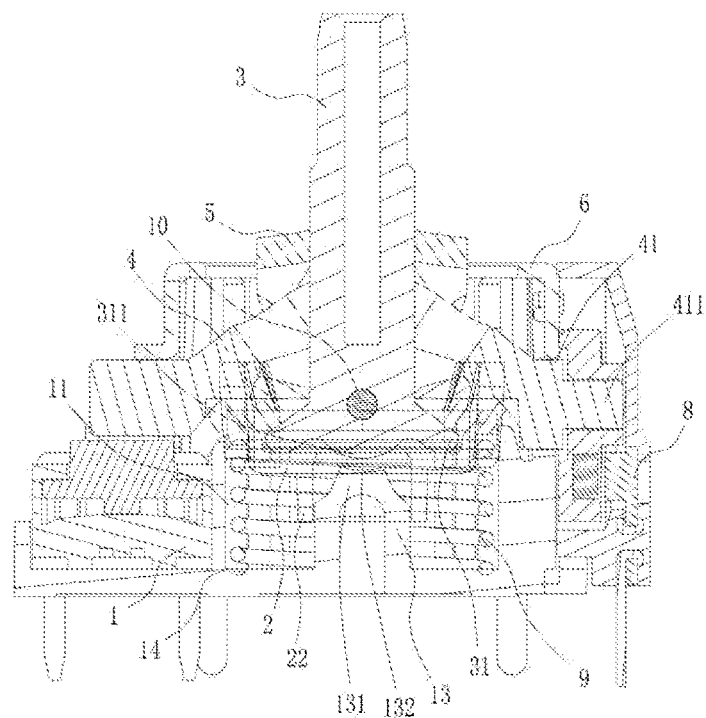
FIG. 4 illustrates a schematic longitudinal cross-sectional structural diagram of the electromagnetic induction type rocker potentiometer according to some embodiments of the disclosure.
Figure 5:
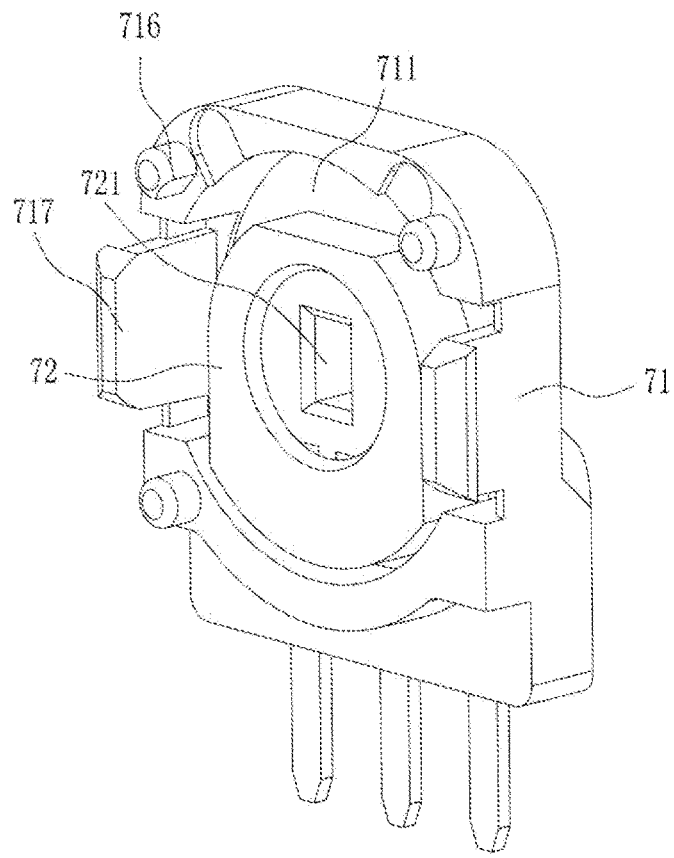
FIG. 5 illustrates a schematic diagram of an overall structure of first or second potentiometer assembly according to some embodiments of the disclosure.
Figure 6:
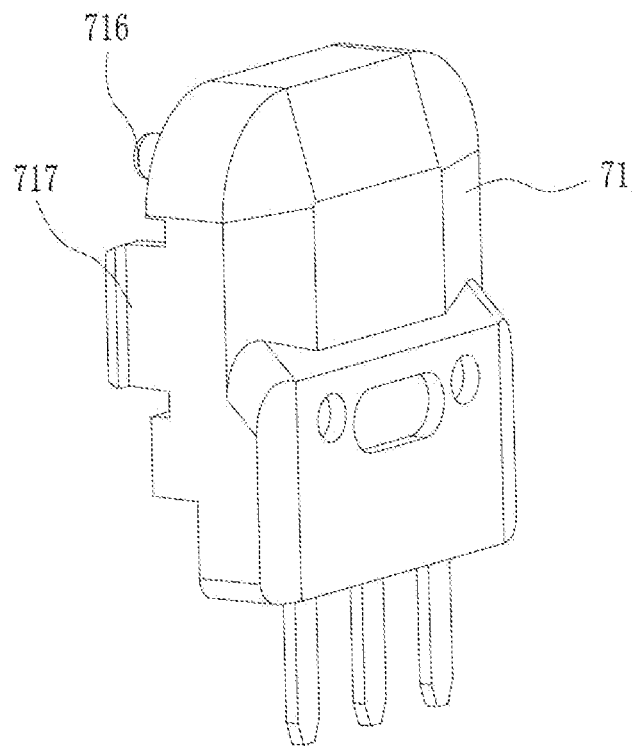
FIG. 6 illustrates another schematic diagram of the overall structure of the first or second potentiometer assembly according to some embodiments of the disclosure.

1—base; 11—cavity; 12—guide foot; 121—guide slot; 13—central rod; 131—frustum-shaped protrusion; 132—concave surface; 14—first spring seat;
2—sliding disc; 21—guide bar; 22—central tube; 221—central through hole; 23—second spring seat;
3—rocker handle; 31—rocker base; 311—spherical protrusion;
4—lower rocking arm (also referred to as second rocking arm); 41—lower rocking arm rotation shaft (also referred to as second rocking arm rotation shaft); 411—rectangular insertion bar;
5—upper rocking arm (also referred to as first rocking arm); 51—upper rocking arm rotation shaft (also referred to as first rocking arm rotation shaft); 511—rectangular insertion bar;
6—iron housing; 61—iron housing positioning hole; 62—positioning slot;
7—first potentiometer assembly; 71—shell; 711—first concave cavity; 7111—first limit surface; 7112—arc-shaped limit block; 7113—arc-shaped limit surface; 713—second through hole; 716—shell positioning column; 717—positioning hook; 718—circular hole; 719—elliptical hole; 72—rotor; 721—first through hole; 722—second concave cavity; 7222—convex bar; 723—circular boss; 73—permanent magnet; 731—magnet slot; 74—magnetic sensing circuit board; 741—magnetic sensor; 742—metal pin;
8—second potentiometer assembly; 9—spring; 10—pin shaft.

DETAILED DESCRIPTION OF EMBODIMENTS

The followings will provide a further detailed description of a structural principle and a working principle of the disclosure in combination with attached drawings.

In the description of a first potentiometer assembly and a second potentiometer assembly in the disclosure, it should be understood that the orientation or position relationship indicated by the terms "upper end", "lower end", "left side", "right side", "inside", "outside", etc. is based on the orientation or position relationship shown in the drawings. The above terms are only used for the convenience of describing the disclosure and simplifying the description, and do not indicate or imply that the device or component referred to must have a specific orientation or be constructed and operated in a specific orientation. Therefore, the above terms cannot be understood as a limitation on the disclosure.

Referring to FIG. 1 through FIG. 10, the disclosure provided an electromagnetic induction type rocker potentiometer, including a base 1, a sliding disc 2, a rocker handle 3, a lower rocking arm 4, an upper rocking arm 5, an iron housing 6, a first potentiometer assembly 7 and a second potentiometer assembly 8. The base 1 is provided with a cavity 11, the sliding disc 2 is disposed in the cavity 11 of the base, the rocker handle 3 is disposed on the sliding disc 2, the iron housing 6 is disposed outside the base 1, the lower rocking arm 4 and the upper rocking arm 5 are individually sleeved on the rocker handle 3, the upper rocking arm 5 is located above the lower rocking arm 4, and the two ends of each of the lower rocking arm 4 and the upper rocking arm 5 individually extend outwards to outside the iron housing 6 and the base 1. Furthermore, the first potentiometer assembly 7 and the second potentiometer assembly 8 are individually disposed on the iron housing 6, and each of the first potentiometer assembly 7 and the second potentiometer assembly 8 respectively includes a shell 71, a rotor 72, a permanent magnet 73 and a magnetic sensing circuit board 74. A left side of the shell 71 (also referred to a side facing towards the iron housing 6) is provided with a first concave cavity 711 to accommodate the rotor 72, and the rotor is rotatable relative to the shell 71. A right side of the shell 71 (also referred to a side exposing under the environment) is injection molded to seal the magnetic sensing circuit board 74, a bottom end of the magnetic sensing circuit board 74 is connected with metal pins 742 to extend downwardly to outside the shell 71, the magnetic sensing circuit board 74 is further provided with a magnetic sensing module (also referred to as a magnetic sensor) 741 thereon, and the magnetic sensing module faces towards a bottom of the first concave cavity 711 at the left side of the shell 71. The rotor 72 is provided with a first through hole 721 and a second concave cavity 722, and the permanent magnet 73 is fixedly mounted in the second concave cavity 722. A right side of the permanent magnet 73 faces towards the magnetic sensing module 741 and a distance between the permanent magnet 73 and the magnetic sensing module 741 in an axial direction of the rotor 72 does not change along with rotation of the rotor 72. Moreover, a shape of each of the second concave cavity and the permanent magnet is cuboid. One of the two ends of the lower rocking arm 4 is rotatably inserted into the first through hole 721 of the rotor 72 of the first potentiometer assembly 7, and one of the two ends of the upper rocking arm 5 is rotatably inserted into the first through hole of the rotor of the second potentiometer assembly 8.

Referring to FIG. 1 through FIG. 4, a side portion of the cavity 11 of the base 1 is connected with a plurality of guide feet 12 and a side portion of the sliding disc 2 is connected with a plurality of guide bars 21 corresponding to and slidably engaged with the plurality of guide feet 12. A middle portion of the cavity 11 of the base 1 is provided with a vertical central rod 13 and a middle portion of the sliding disc 2 is provided with a vertical central tube 22. The central tube 22 has a central through hole 221 with opened ends and the central rod 13 is inserted upwards into the central through hole 221 of the central tube 22. The sliding disc 2 of the disclosure can be laterally positioned with the guide feet 12 disposed above the base 1 by means of the guide bars 21 at the side portion of the sliding disc 2. In addition, the sliding disc 2 of the disclosure can be centrally positioned with the central rod 13 of the base 1 through the central tube 22, thereby realizing a precise center positioning and an accuracy resetting.

Referring to FIG. 1 through FIG. 4, a lower end of the rocker handle 3 is provided with a rocker base 31, which slidably fits with an upper surface of the sliding disc 2, and a lower side of the rocker base 31 is provided with a spherical protrusion 311, which is arranged above a middle portion of the central through hole 221. In addition, an upper end of the central rod 13 is provided with a frustum-shaped protrusion 131, an upper end of the frustum-shaped protrusion 131 is provided with a concave surface 132, and the spherical protrusion 311 fits with the concave surface 132.

Referring to FIG. 1 through FIG. 4 in combination with FIG. 5 through FIG. 10, the lower rocking arm 4 includes a lower rocking arm body and a lower rocking arm rotation shaft 41 connected with two ends of the lower rocking arm body, and the lower rocking arm body arches upwards and is movably sleeved on the rocker handle 3. Similarly, the upper rocking arm 5 includes an upper rocking arm body and an upper rocking arm rotation shaft 51 connected with two ends of the upper rocking arm body, and the upper rocking arm body arches upwards and is movably sleeved on the rocker handle 3. In addition, the first through holes of the rotors of the first potentiometer assembly 7 and the second potentiometer assembly 8 are both I-shaped through holes or rectangular through holes, an end portion of each of the lower rocking arm rotation shaft 41 and the upper rocking arm rotation shaft 51 is respectively provided with a rectangular insertion bar 411 and a rectangular insertion bar 511, and the rectangular insertion bars 411, 511 are respectively matched with the corresponding first through holes. Furthermore, a pin shaft 10 is inserted between the lower rocking arm 4 and the rocker handle 3 and an axial direction of the pin shaft 10 is consistent with that of the upper rocking arm rotation shaft 51.

Referring to FIG. 1 through FIG. 4, the electromagnetic induction type rocker potentiometer further includes a spring. In addition, a first spring seat 14 is disposed in the cavity 11 of the base 1, a lower end of the sliding disc 2 is provided with a second spring seat 23, and then a lower end of the spring 9 is disposed above the first spring seat 14 and an upper end of the spring 9 is disposed below the second spring seat 23. Furthermore, inner walls of the plurality of guide feet 12 are provided with a plurality of guide slots 121, and at least one guide slot 121 is provided with a position limit mechanism to limit a sliding endpoint position of a corresponding one of the plurality of guide bars 21.

Figure 7:
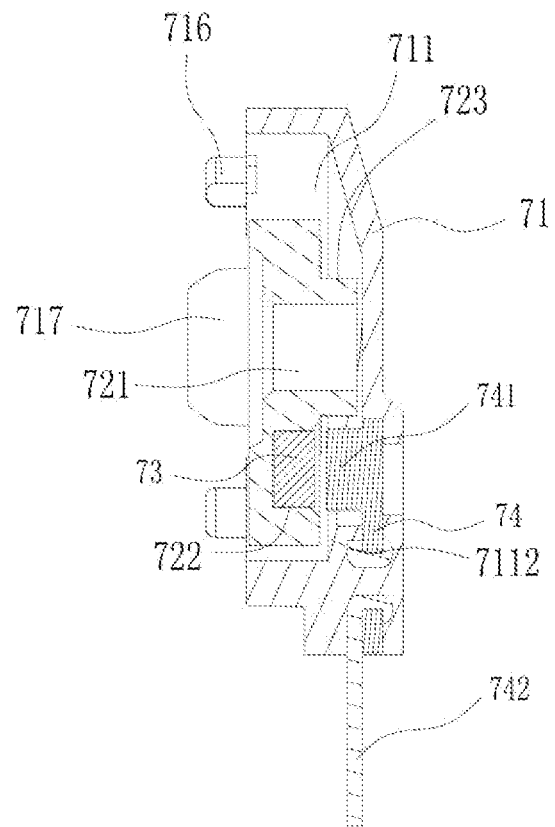
FIG. 7 illustrates a schematic longitudinal cross-sectional structural diagram of the first or second potentiometer assembly according to some embodiments of the disclosure.
Figure 8:
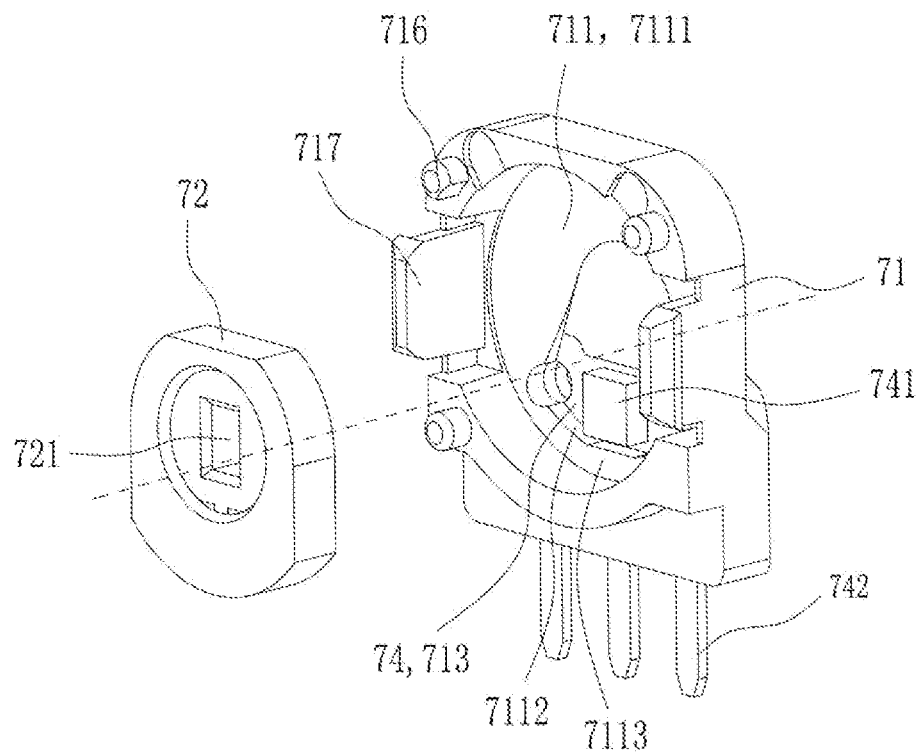
FIG. 8 illustrates a schematic disassembled structural diagram of the first or second potentiometer assembly according to some embodiments of the disclosure.

Referring to FIG. 7 through FIG. 8, the right side of the shell 71 is provided with a second through hole 713, which is communicated with the first concave cavity 711 and located between the first concave cavity 711 and the magnetic sensing circuit board 74. The magnetic sensing module 741 leftwards passes through the second through hole 713 and extends into the first concave cavity 711. The magnetic sensing module 741 is packaged as an integrated circuit chip, which is equal to a Hall sensor. The disclosure is provided with the second through hole 713 to allow for no barrier between the magnetic sensing module 741 and the permanent magnet 73, making the magnetic sensing module 741 directly face towards the permanent magnet 73.

Figure 10:
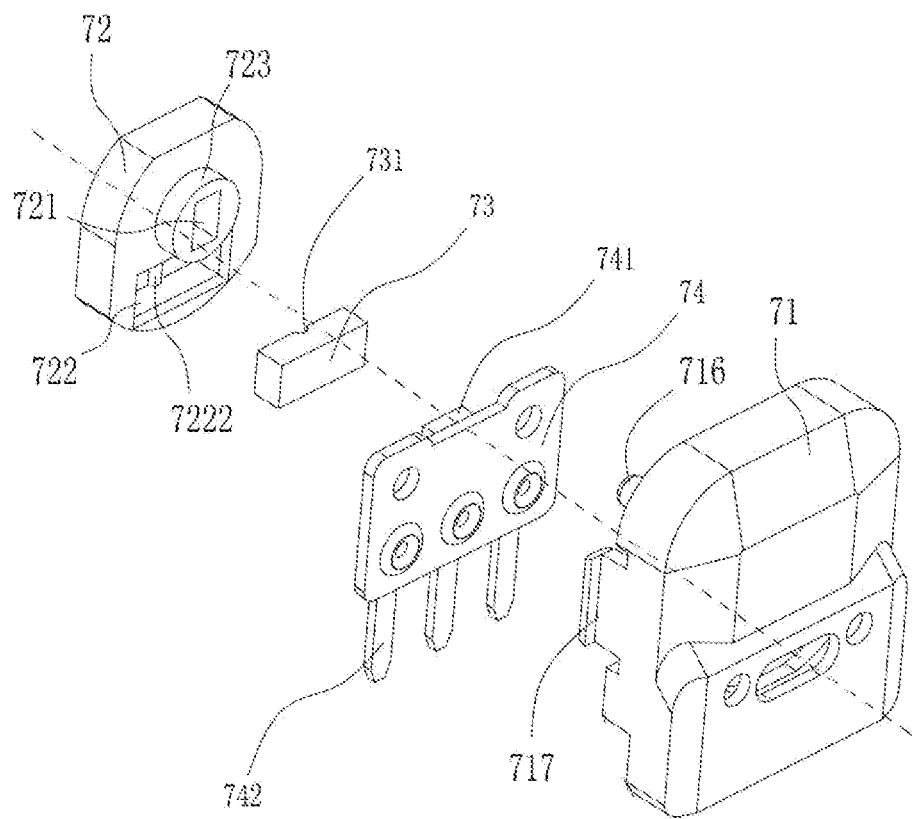
FIG. 10 illustrates a still another schematic disassembled structural diagram of the first or second potentiometer assembly according to some embodiments of the disclosure.
Figure 11:
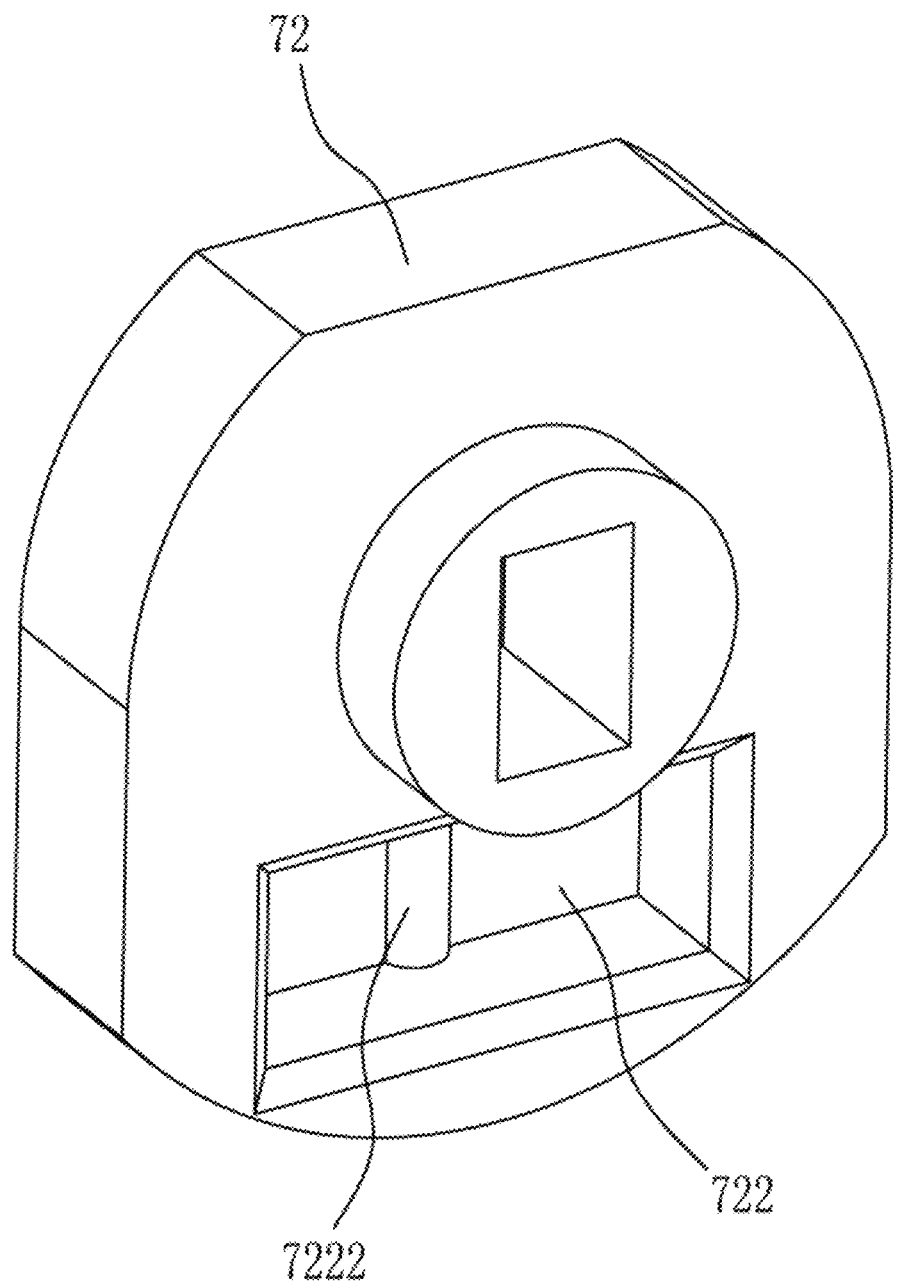
FIG. 11 illustrates a schematic diagram of a rotor in FIG. 10.
Figure 12:
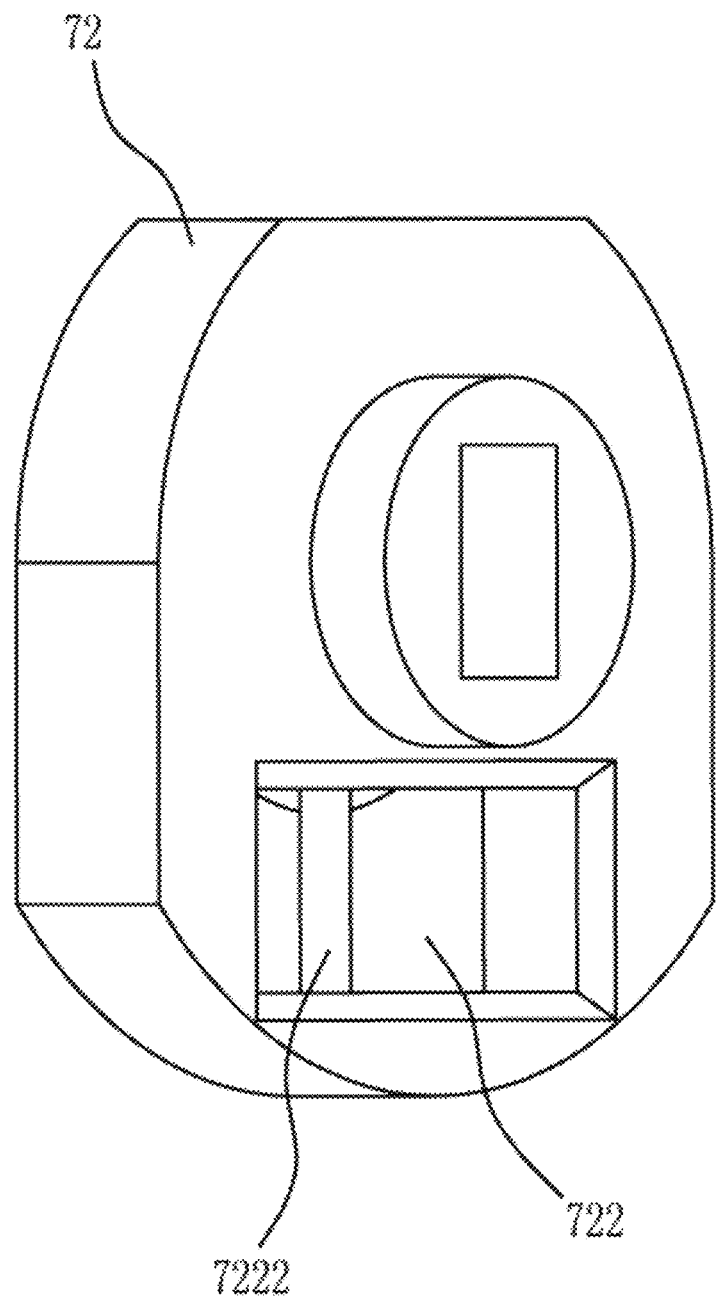
FIG. 12 illustrates another schematic diagram of the rotor in FIG. 10.

As shown in FIGS. 10-12, the second concave cavity 722 is located at a lower end of the rotor 72, and a right side of the second concave cavity 722 is opened. The permanent magnet 73 is snapped into the second concave cavity 722 from right to left, a left side of a middle portion between two magnetic poles of the permanent magnet 73 is provided with a magnet slot 731, and the second concave cavity 722 is provided with a convex bar 7222 matched with the magnet slot 731. The disclosure is provided with the magnet slot 731 to distinguish the two magnetic poles of the permanent magnet 73 on the one hand, namely distinguishing the S pole and N pole, and to make magnetic properties of the S and N poles more stable after magnetization on the other hand.

Referring to FIG. 5 through FIG. 10, a bottom of the first concave cavity 711 is provided with a first limit surface 7111, a right side of a middle portion of the rotor 72 is provided with a circular boss 723, the first through hole 711 penetrates through the circular boss 723, and a right side surface of the circular boss 723 and the first limit surface 7111 are position-limiting fitted with each other. A lower end of the first concave cavity 711 is provided with an arc-shaped limit block 7112, and a left side of the arc-shaped limit block 7112 is provided with an arc-shaped limit surface 7113. In addition, a right side surface of a lower end of the rotor 72 and the arc-shaped limit surface 7113 are position-limiting fitted with each other.

Referring to FIG. 1 through FIG. 10, there are three shell positioning columns 716 extending leftwards disposed on corners at the left side of the shell 71. Furthermore, the iron housing 6 is provided with corresponding iron housing positioning holes 61 that are insertedly matched with the three shell positioning columns 716, respectively. Moreover, a middle portion of the left side of the shell 71 is provided with two positioning hooks 717 extending leftwards, and the iron housing 6 is further provided with positioning slots 62 that are snapped with the positioning hooks 717, respectively.

Figure 9:
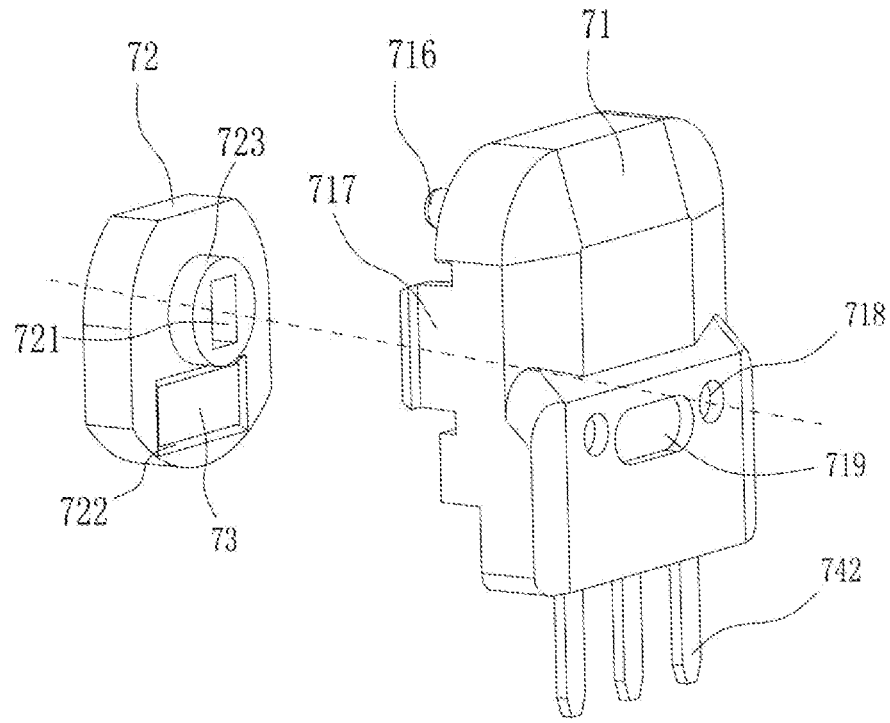
FIG. 9 illustrates another schematic disassembled structural diagram of the first or second potentiometer assembly according to some embodiments of the disclosure.

As shown in FIG. 9, the right side of the shell 71 is provided with two circular holes 718, and there is an elliptical hole 719 disposed between the two circular holes 718. The two circular holes 718 and the elliptical hole 719 are formed after injection molding to seal the magnetic sensing circuit board 74. A packaging method of the shell 71 and the magnetic sensing circuit board 74 is as follows. The magnetic sensing circuit board 74 is placed into an injection mold of the shell 71, two positioning pins inside the injection mold are inserted into positioning holes of the magnetic sensing circuit board 74, and a positioning iron block inside the injection mold simultaneously abuts against the magnetic sensing circuit board 74, thus positioning the magnetic sensing circuit board 74. And then, polymer is injected into the injection mold, thereafter waiting for cooling, opening the mold, and the shell 71 containing the magnetic sensing circuit board 74 is taken out, thereby generating the two circular holes 718 and the elliptical hole 719 on the right side of the shell 71. The disclosure uses the injection molding method to seal the magnetic sensing circuit board 74, which can greatly improve assembly efficiency and improve the connection accuracy between the magnetic sensing circuit board 74 and the shell 71.

The above description only describes the illustrated embodiments of the disclosure. Any amendments, equivalent replacements, and modifications made to the above embodiments based on the technical solution of the disclosure fall within the scope of the technical solution of the disclosure.

What is claimed is:

1. An electromagnetic induction type rocker potentiometer, comprising: a base, a sliding disc, a rocker handle, a lower rocking arm, an upper rocking arm, an iron housing, a first potentiometer assembly, and a second potentiometer assembly;
   wherein the base is provided with a cavity, the sliding disc is disposed in the cavity of the base, the rocker handle is disposed on the sliding disc, the iron housing is disposed outside the base, the lower rocking arm and the upper rocking arm are individually sleeved on the rocker handle, the upper rocking arm is located above the lower rocking arm, and two ends of each of the lower rocking arm and the upper rocking arm individually extend outwards to outside the iron housing and the base;
   wherein the first potentiometer assembly and the second potentiometer assembly are individually disposed on the iron housing, and each of the first potentiometer assembly and the second potentiometer assembly comprises: a shell, a rotor, a permanent magnet, and a magnetic sensing circuit board;
   wherein a left side of the shell is provided with a first concave cavity, the rotor is accommodated in the first concave cavity and is rotatable relative to the shell; a right side of the shell is injection molded to seal the magnetic sensing circuit board, a bottom end of the magnetic sensing circuit board is connected with metal pins, the metal pins extend downwardly to outside the shell, the magnetic sensing circuit board has a magnetic sensor disposed thereon, and the magnetic sensor faces towards a bottom of the first concave cavity at the left side of the shell;
   wherein the rotor is provided with a first through hole and a second concave cavity, the permanent magnet is fixedly mounted in the second concave cavity, a right side of the permanent magnet faces towards the magnetic sensor, a distance between the permanent magnet and the magnetic sensor in an axial direction of the rotor does not change along with rotation of the rotor; and
   wherein one of the two ends of the lower rocking arm is rotatably inserted into the first through hole of the rotor of the first potentiometer assembly, and one of the two ends of the upper rocking arm is rotatably inserted into the first through hole of the rotor of the second potentiometer assembly.

2. The electromagnetic induction type rocker potentiometer according to claim 1, wherein a shape of each of the second concave cavity and the permanent magnet is cuboid.

3. The electromagnetic induction type rocker potentiometer according to claim 1, wherein a side portion of the cavity of the base is connected with a plurality of guide feet, and a side portion of the sliding disc is connected with a plurality of guide bars corresponding to and slidably engaged with the plurality of guide feet;
   wherein a middle portion of the cavity of the base is provided with a vertical central rod, a middle portion of the sliding disc is provided with a vertical central tube, the central tube has a central through hole with opened ends, and the central rod is inserted upwards into the central through hole of the central tube;
   wherein a lower end of the rocker handle is provided with a rocker base, the rocker base slidably fits with an upper surface of the sliding disc, a lower side of the rocker base is provided with a spherical protrusion, and the spherical protrusion is arranged above a middle portion of the central through hole; and
   wherein an upper end of the central rod is provided with a frustum-shaped protrusion, an upper end of the frustum-shaped protrusion is provided with a concave surface, and the spherical protrusion fits with the concave surface.

4. The electromagnetic induction type rocker potentiometer according to claim 3, wherein inner walls of the plurality of guide feet are provided with a plurality of guide slots, respectively; and at least one of the plurality of guide slots is provided with a position limit mechanism, and the position limit mechanism is configured to limit a sliding endpoint position of a corresponding one of the plurality of guide bars.

5. The electromagnetic induction type rocker potentiometer according to claim 1, wherein the lower rocking arm comprises: a lower rocking arm body, and a lower rocking arm rotation shaft connected with two ends of the lower rocking arm body; and the lower rocking arm body arches upwards and is movably sleeved on the rocker handle; and
   wherein the upper rocking arm comprises: an upper rocking arm body, and an upper rocking arm rotation shaft connected with two ends of the upper rocking arm body; and the upper rocking arm body arches upwards and is movably sleeved on the rocker handle.

6. The electromagnetic induction type rocker potentiometer according to claim 5, wherein the first through hole of the rotor of each of the first potentiometer assembly and the second potentiometer assembly is one of a I-shaped through hole and a rectangular through hole;
   wherein an end portion of each of the lower rocking arm rotation shaft and the upper rocking arm rotation shaft is provided with one of an I-shaped insertion bar and a rectangular insertion bar that is matched with the first through hole;
   wherein a pin shaft is inserted between the lower rocking arm and the rocker handle, and an axial direction of the pin shaft is consistent with an axial direction of the upper rocking arm rotation shaft.

7. The electromagnetic induction type rocker potentiometer according to claim 1, further comprising a spring, wherein a first spring seat is disposed in the cavity of the base, a lower end of the sliding disc is provided with a second spring seat, a lower end of the spring is disposed above the first spring seat, and an upper end of the spring is disposed below the second spring seat.

8. The electromagnetic induction type rocker potentiometer according to claim 1, wherein the right side of the shell is provided with a second through hole, the second through hole is communicated with the first concave cavity and located between the first concave cavity and the magnetic sensing circuit board, the magnetic sensor leftwards passes through the second through hole and extends into the first concave cavity, and the magnetic sensor is packaged as an integrated circuit chip.

9. The electromagnetic induction type rocker potentiometer according to claim 1, wherein the second concave cavity is located at a lower end of the rotor, a right side of the second concave cavity is opened, the permanent magnet is snapped into the second concave cavity from right to left, a left side of a middle portion between two magnetic poles of the permanent magnet is provided with a magnet slot, and the second concave cavity is provided with a convex bar matched with the magnet slot.

10. The electromagnetic induction type rocker potentiometer according to claim 1, wherein a bottom of the first concave cavity is provided with a first limit surface, a right side of a middle portion of the rotor is provided with a circular boss, the first through hole penetrates through the circular boss, and a right side surface of the circular boss and the first limit surface are position-limiting fitted with each other; and wherein a lower end of the first concave cavity is provided with an arc-shaped limit block, a left side of the arc-shaped limit block is provided with an arc-shaped limit surface, and a right side surface of a lower end of the rotor and the arc-shaped limit surface are position-limiting fitted with each other.

11. The electromagnetic induction type rocker potentiometer according to claim 1, wherein corners at the left side of the shell are provided with three shell positioning columns extending leftwards, and the iron housing is provided with iron housing positioning holes insertedly matched with the three shell positioning columns respectively; and wherein a middle portion of the left side of the shell is provided with two positioning hooks extending leftwards, and the iron housing is provided with positioning slots configured to be snapped with the positioning hooks, respectively.

* * * * *